United States Patent
Patel et al.

(10) Patent No.: US 6,342,317 B1
(45) Date of Patent: Jan. 29, 2002

(54) BATTERY

(75) Inventors: Bhupendra K. Patel, Mansfield; Gary M. Searle, Norfolk; John D. Sillesky, Franklin, all of MA (US); Gary T. Viveiros, Tiverton, RI (US); Viet H. Vu, Medway; Douglas Woodnorth, Needham, both of MA (US)

(73) Assignee: The Gillette Company, Boston, MA (US)

( * ) Notice: Subject to any disclaimer, the term of this patent is extended or adjusted under 35 U.S.C. 154(b) by 0 days.

(21) Appl. No.: 09/358,578

(22) Filed: Jul. 21, 1999

(51) Int. Cl.$^7$ .................................................. H01M 2/04
(52) U.S. Cl. ...................... 429/176; 429/206; 429/209; 429/224; 429/229
(58) Field of Search ................................. 429/206, 209, 429/224, 229, 176

(56) References Cited

U.S. PATENT DOCUMENTS

| | | |
|---|---|---|
| 323,902 A * | 8/1885 | Brewer |
| 1,995,294 A | 3/1935 | Cullen |
| 2,605,298 A | 7/1952 | Marsal |
| 2,980,747 A | 4/1961 | Daley |
| 4,154,906 A | 5/1979 | Bubnick et al. |
| 4,281,046 A | 7/1981 | Davis, Jr. |
| 4,283,470 A | 8/1981 | Freeman et al. |
| 4,318,968 A | 3/1982 | Berger et al. |
| 4,360,575 A | 11/1982 | Brennan |
| 5,045,415 A | 9/1991 | Witehira |
| 5,248,572 A | 9/1993 | Shoji et al. |
| 5,294,499 A | 3/1994 | Furukawa et al. |
| 5,434,019 A | 7/1995 | Zhang et al. |
| 5,472,806 A | 12/1995 | Meintjes |
| 5,482,796 A | 1/1996 | Wang et al. |
| 5,545,492 A | 8/1996 | Zito |
| 5,576,116 A | 11/1996 | Sanchez et al. |
| 5,639,578 A | 6/1997 | Urry |
| 5,674,639 A | 10/1997 | Urry |
| 5,677,080 A * | 10/1997 | Chen ............................ 429/167 |
| 5,682,288 A | 10/1997 | Wani |
| 5,821,012 A | 10/1998 | McCullough |
| 5,869,205 A | 2/1999 | Mick et al. |
| 5,948,561 A | 9/1999 | Urry |
| 6,150,052 A * | 11/2000 | Urry ............................ 429/128 |

FOREIGN PATENT DOCUMENTS

| | | |
|---|---|---|
| DE | 55781 | 7/1890 |
| FR | 2622359 A1 | 10/1987 |
| GB | 211255 | 11/1922 |
| GB | 2 231 196 A | 11/1990 |
| JP | 2-295063 | 12/1990 |
| JP | 7-326347 | 12/1995 |
| JP | 7-326370 | 12/1995 |
| WO | WO 00/01022 | 1/2000 |

* cited by examiner

*Primary Examiner*—Carol Chaney
*Assistant Examiner*—Dah-Wei D. Yuan
(74) *Attorney, Agent, or Firm*—Fish & Richardson P.C.

(57) ABSTRACT

A battery includes a housing, a first electrode, and a non-cylindrical second electrode within the first electrode.

54 Claims, 5 Drawing Sheets

BATTERY

BACKGROUND OF THE INVENTION

This invention relates to batteries.

Batteries, such as alkaline batteries, are commonly used as energy sources. Generally, alkaline batteries include a cathode, an anode, a separator, and an electrolytic solution. The cathode is typically formed of an active material (e.g., manganese dioxide), carbon particles, and a binder. The anode can be a gel including an active material (e.g., zinc particles). The separator is usually disposed between the cathode and the anode. The electrolytic solution, which is dispersed throughout the battery, can be a hydroxide solution.

Alkaline batteries include the conventional AA, AAA, AAAA, C, and D batteries commonly sold in stores. These conventional alkaline batteries include a cylindrical container containing a central, cylindrical zinc gel anode surrounded by a ring-shaped manganese dioxide cathode.

It generally is desirable for a battery to have a long service life. One measure of the service life of a battery is the length of time the battery can discharge under a given load before the voltage drops to an unacceptable level.

SUMMARY OF THE INVENTION

The invention relates to a battery having an increased service life when discharged continuously, for example, at 1 amp.

In one aspect, the invention features a battery having a housing, a first electrode within the housing, a second electrode within the first electrode, and a separator between the first electrode and the second electrode. The second electrode is non-cylindrical provides an increased interface area between the first electrode and the second electrode. Because the second electrode is non-cylindrical, it has surface bounded by a first circle of radius $r_1$ and a second circle of radius $r_2$. Preferably, the inner radius is less than 90% of $r_1$, more preferably less than 70% of $r_1$, and most preferably less than 60% of $r_1$.

In preferred embodiments, the circumference of the second electrode may be curvalinear (i.e., formed, bounded, or characterized at least in part by curved lines); the first electrode may be a cathode including manganese dioxide; the second electrode may be an anode including zinc; the housing may be cylindrical; and the second electrode includes two, three, or four lobes. The battery may be, for example, an AA, AAA, AAAA, C or D battery.

The service performance of a battery also depends on the efficiency with which the battery uses the active material of the anode and the cathode during discharge. Another aspect of the invention relates to a battery including a first electrode and a second electrode having a plurality of lobes. A first lobe has a first generally linear side portion that is a distance $d_1$ from a side portion (preferably a generally linear side portion) of an adjacent lobe. The first lobe is a minimum distance $d_2$ from the housing, and the ratio $d_1:d_2$ for the first lobe is between 1.5:1 and 2.5:1. Maintaining a $d_1:d_2$ ratio of between 1.5:1 and 2.5:1 enhances the efficiency with which the battery uses the active materials because the cathode material between the first lobe and the adjacent second lobe will be consumed at approximately twice the rate as the cathode material between the first lobe and the housing. Preferably, the ratio $d_1:d_2$ is between 1.7:1 and 2.3:1, more preferably between 1.8:1 and 2.2:1, and most preferably between 1.9:1 and 2.1:1.

In preferred embodiments, the first lobe also has a second generally linear side portion that also is the distance $d_1$ from another side portion (preferably a generally linear side portion) of an adjacent lobe. In addition, the lobe including the generally parallel side portion also is a minimum distance $d_2$ from the housing.

The minimum distance ($d_1$) can be measured at any position along the length of the battery by determining the minimum distance between the surface of the first electrode adjacent the halfway point of the generally linear side portion of the first lobe and a surface of the first electrode adjacent the halfway point of the side portion of the adjacent lobe. The minimum distance ($d_2$) is measured at the same position along the length of the battery by determining the minimum distance between a surface of the first electrode adjacent the lobe and a surface of the first electrode adjacent the housing. For example, $d_1$ and $d_2$ can be measured at the halfway point along the length of the battery, or one third of the way along the length of the battery, or two thirds of the way along the length of the battery. In some embodiments, the ratio $d_1:d_2$ is the average ratio $d_1:d_2$ along the length of the battery.

Other features and advantages of the invention will be apparent from the description of the preferred embodiments thereof, and from the claims.

DESCRIPTION OF THE PREFERRED EMBODIMENTS

Figure 1:
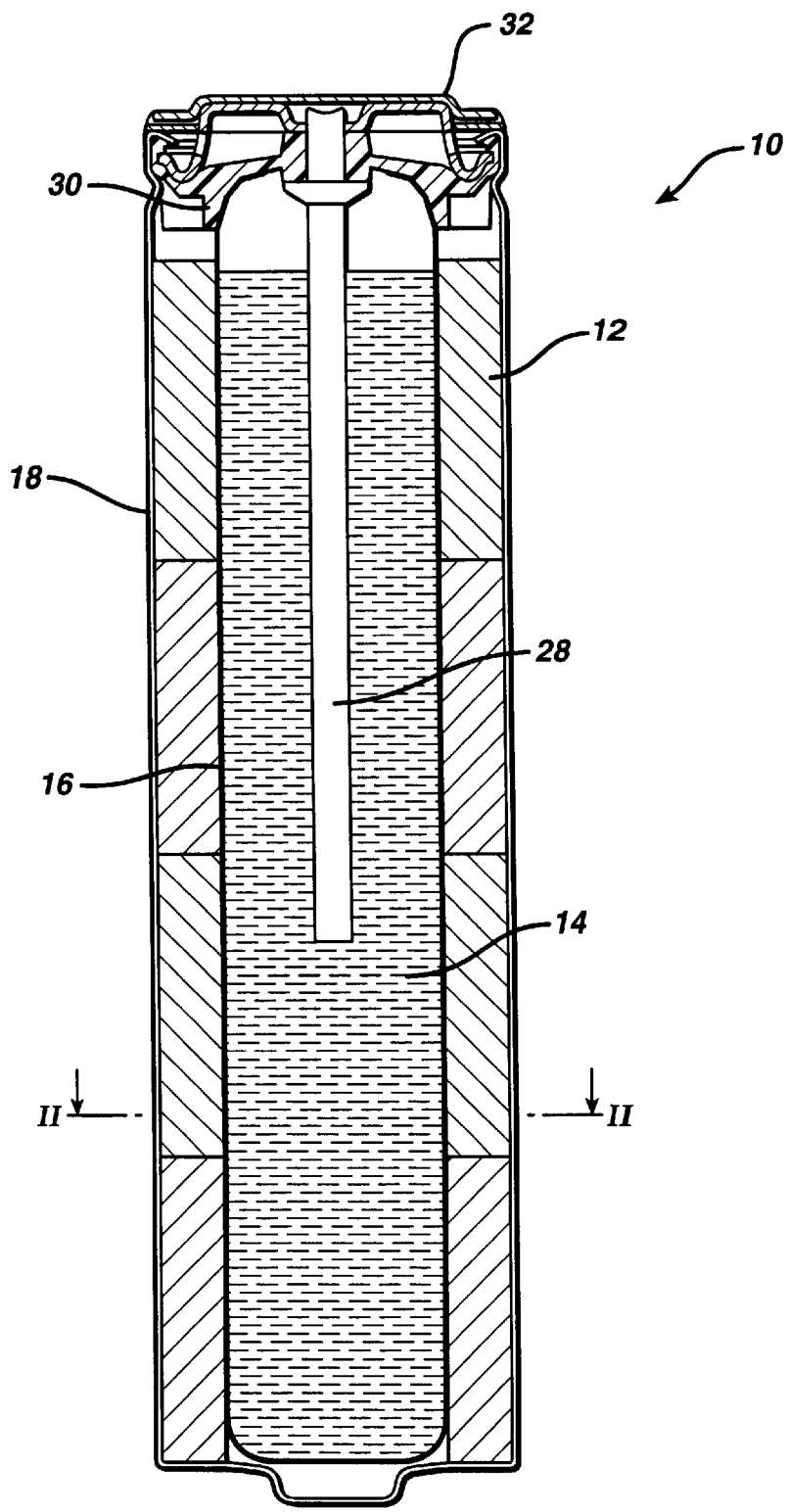
FIG. 1 is a side-sectional view of a battery including a central anode having four lobes taken through the center of the battery.
Figure 2:
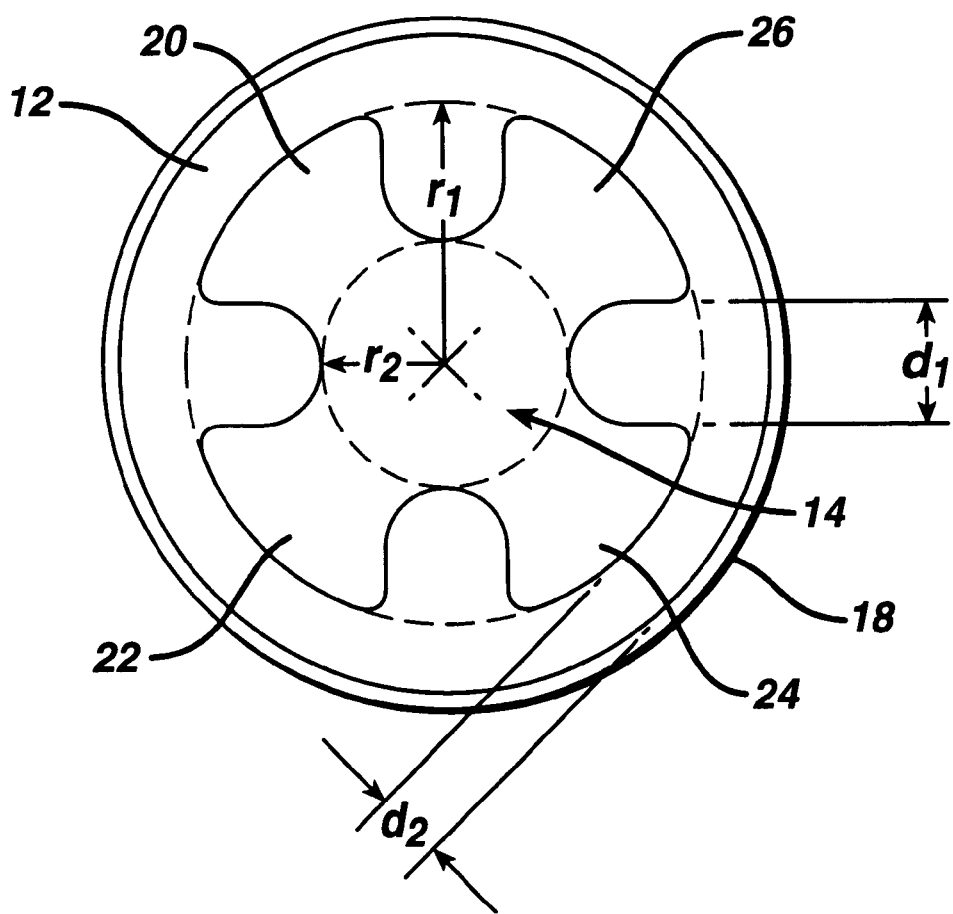
FIG. 2 is a cross-sectional view of the battery in FIG. 1, taken at II—II in FIG. 1.

Referring to FIGS. 1 and 2, battery 10 includes a cathode 12, an anode 14, separator 16 and a cylindrical housing 18. Anode 14 includes four lobes (20, 22, 24, and 26). Battery 10 also includes current collector 28, seal 30, and a negative metal top cap 32, which serves as the negative terminal for the battery. The cathode is in contact with the housing, and the positive terminal of the battery is at the opposite end of the battery from the negative terminal. An electrolytic solution is dispersed throughout battery 10. For purposes of the dimensions for the example described below, battery 10 is a AA battery.

Cathode 12 includes manganese dioxide, carbon particles, and a binder.

Any of the conventional forms of manganese dioxide used for cathodes can be used. The preferred manganese dioxide is EMD, although CMD can also be used. Distributors of such manganese dioxides include Kerr McGee, Co. (Trona D), Chem Metals, Co., Tosoh, Delta Manganese, Mitsui Chemicals and JMC. Generally, the cathode will include between 80% and 88% of manganese dioxide by weight.

The carbon particles also can be any of the conventional carbon particles used in cathodes. They can be synthetic or nonsynthetic, and they can be expanded or nonexpanded. In certain embodiments, the carbon particles are nonsynthetic, nonexpanded graphite particles. In these embodiments, the graphite particles preferably have an average particle size of less than about 20 microns, more preferably from about 2 microns to about 12 microns, and most preferably from about 5 microns to about 9 microns as measured using a Sympatec HELIOS analyzer. Nonsynthetic, nonexpanded graphite particles can be obtained from, for example, Brazilian Nacional de Grafite (Itapecirica, MG Brazil (MP-0702X). Generally, the cathode will include between 5% and 8% of carbon particles by weight.

Examples of binders include polyethylene powders, polyacrylamides, Portland cement and fluorocarbon resins, such as PVDF and PTFE. An example of a polyethylene binder is sold under the tradename Coathylene HA-1681 (Hoescht). Generally, the cathode includes between 0.1 percent to about 1 percent of binder by weight.

Cathode 12 can include other additives. Examples of these additives are disclosed in U.S. Pat. No. 5,342,712, which is hereby incorporated by reference. Cathode 12 may include, for example, from about 0.2 weight percent to about 2 percent $TiO_2$ weight.

The electrolyte solution also is dispersed through cathode 12, and the weight percentages provided above are determined after the electrolyte solution has been dispersed.

Anode 14 has an extended surface bounded by a first circle of radius $r_1$ of 5.35 mm and a second circle of radius $r_2$ of 2.49 mm. Each lobe in anode 14 has two linear side portions and a curved outer portion. The linear side portions on adjacent lobes are parallel and separated at their halfway point by a distance ($d_1$) of 2.49 mm. In addition, the lobe is a minimum distance ($d_2$) of 1.3 mm from the housing.

Anode 14 can be formed of any of the standard zinc materials used in battery anodes. For example, anode 14 can be a zinc gel that includes zinc metal particles, a gelling agent and minor amounts of additives, such as gassing inhibitor. In addition, a portion of the electrolyte solution is dispersed throughout the anode.

The zinc particles can be any of the zinc particles conventionally used in gel anodes. Other examples of zinc particles used in the anode include these described in U.S. Ser. No. 08/905,254, U.S. Ser. No. 09/115,867, and U.S. Ser. No. 09/156,915, which are assigned to the assignee in the present application and are hereby incorporated by reference. Generally, the anode includes between 67% and 71% of zinc particles by weight.

Gelling agents that can be used in anode 14 include polyacrylic acids, grafted starch materials, salts of polyacrylic acids, polyacrylates, carboxymethylcellulose or combinations thereof. Examples of such polyacrylic acids are Carbopol 940 and 934 (B.F. Goodrich) and Polygel 4P (3V), and an example of a grafted starch material is Waterlock A221 (Grain Processing Corporation, Muscatine, IA). An example of a salt of a polyacrylic acid is Alcosorb G1, (Ciba Specialties). The anode generally includes from 0.1 percent to about 1 percent gelling agent by weight. These weight percentages correspond to when the electrolytic solution is dispersed throughout the anode.

Gassing inhibitors can be inorganic materials, such as bismuth, tin, lead and indium. Alternatively, gassing inhibitors can be organic compounds, such as phosphate esters, ionic surfactants or nonionic surfactants. Examples of ionic surfactants are disclosed in, for example, U.S. Pat. No. 4,777,100, which is hereby incorporated by reference.

Separator 16 can have any of the conventional designs for battery separators. In some embodiments, separator 16 can be formed of two layers of nonwoven, non-membrane material with one layer being disposed along a surface of the other. To minimize the volume of separator 16 while providing an efficient battery, each layer of nonwoven, non-membrane material can have a basis weight of about 54 grams per square meter, a thickness of about 5.4 mils when dry and a thickness of about 10 mils when wet. In these embodiments, the separator preferably does not include a layer of membrane material or a layer of adhesive between the nonwoven, non-membrane layers. Generally, the layers can be substantially devoid of fillers, such as inorganic particles.

In other embodiments, separator 16 includes an outer layer of cellophane with a layer of nonwoven material. The separator also includes an additional layer of nonwoven material. The cellophane layer can be adjacent cathode 12 or the anode. Preferably, the nonwoven material contains from about 78 weight percent to about 82 weight percent PVA and from about 18 weight percent to about 22 weight percent rayon with a trace of surfactant. Such nonwoven materials are available from PDM under the tradename PA36.

The electrolytic solution dispersed throughout battery 10 can be any of the conventional electrolytic solutions used in batteries. Typically, the electrolytic solution is an aqueous hydroxide solution. Such aqueous hydroxide solutions include potassium hydroxide solutions including, for example, between 33% and 38% by weight percent potassium hydroxide, and sodium hydroxide solutions.

Housing 18 can be any conventional housing commonly used in primary alkaline batteries. The housing typically includes an inner metal wall and an outer electrically non-conductive material such as heat shrinkable plastic. Optionally, a layer of conductive material can be disposed between the inner wall and the cathode 12. This layer may be disposed along the inner surface of wall, along the outer circumference of cathode 12 or both. This conductive layer can be formed, for example, of a carbonaceous material. Such materials include LB1000 (Timcal), Eccocoat 257 (W.R. Grace & Co.), Electrodag 109 (Acheson Industries, Inc.), Electrodag 112 (Acheson) and EB0005 (Acheson). Methods of applying the conductive layer are disclosed in, for example, Canadian Patent No. 1,263,697, which is hereby incorporated by reference.

Current collector 28 is made from a suitable metal, such as brass. Seal 30 can be made, for example, of nylon.

An example of battery 10 (AA) was prepared according to the following procedure. An $MnO_2$ cathode mix is prepared by combining 85.5% EMD (from Kerr McGee), 7.3% graphite (Coathylene HA1681 from Hoescht), 0.3% polyethylene binder (MP-0702X from Nacional de Graphite), and 6.9% electrolyte solution. The $MnO_2$ mix then is compressed under pressure in a die slotted with a four lobe cavity using the following equipment and procedure:

Equipment: Carver Automatic Press, 3888, 1DI0A00, Pellet Die Assembly (Pellet Die Sleeve, Bottom Punch and Core Pin, 29.88 mm, height gage, Top Punch and Core Extractor, Bottom Plate), Balance (3 decimal place), Digital Calipers (0.01 mm).

Procedure:
1. Assemble the pellet die tooling by placing the core pin inside the bottom punch. Slide the pellet die sleeve over the core pin and bottom punch and place the assembly on the bottom plate.
2. Weigh out the granulated $MnO_2$ mix and pour evenly into the assembly.
3. Place the top punch over the core road and press down until the punch is seated. Slide the height gage around the punch rod.

4. Place the core remover on top of the assembly and load the assembly inside the Carver Automatic Press.
5. Set the press to 5000 psi compression strength and 75% compression speed. Dwell time is set at 4 seconds.
6. Depress both the activator buttons to raise the assembly until 700 psi registers on the read-out. Allow the press to finish its cycle.
7. Remove the assembly and place the core remover on the bottom of the pellet die assembly. Insert the core pin remover into the assembly and place back into the press.
8. Depress both of the activator buttons until the top punch closes to approximately 1 cm of the pellet die sleeve. If a read-out in excess of 400 psi occurs, reject the pellet.
9. Remove the core rod and reinsert the assembly. Place the core remover over the assembly and place in the press.
10. Depress the activator buttons until the pellet die sleeve has been separated from the formed pellet.
11. Measure the height of each pellet. Reject any pellets that are not in spec (10.85+/−0.15 mm). Place all in-spec material in a moisture resistant heat sealable bag and label for the Recompaction Procedure.

Four pellets were inserted into a housing (a DBD can with flattened rim area) and recompacted inside the housing using the following equipment and procedure:

Equipment: Carver Automatic Press, 38881DI0A00, Pellet Recompaction Assembly (can sleeve, PIP Backing Plate, Recompaction die and 3 prong can remover, core pin, punch retainer, and bottom plate), Balance (3 decimal place), Digital Calipers (0.01 mm).

Procedure:
1. Slide the recompaction die onto the punch retainer.
2. Select 4 pellets and measure and record the height and weight of each in-spec pellet.
3. Slide each pellet onto the core pin. Reject any pellets that are too tight or become cracked or chipped.
4. Place a bottom insulator into the DBD can and slide over the stacked pellets. Make sure the can is firmly pressed down all the way.
5. Place the can sleeve over the can and place the PIP support on top of the assembly. Insert the 3 prong can remover into the hole in the punch retainer. Place the assembly inside the Carver Automatic Press.
6. Switch the press to manual mode and set to 1500 psi compression strength and 30% compression speed.
7. Depress both of the activator buttons to raise the assembly until 1500 registers on the read-out. When the dwell time reads 4 seconds, depress the stop button.
8. Remove the can sleeve and PIP support from the assembly.
9. Place the two columns of the support blocks (3 inch height/double stack) inside the press. Place the recompacted can, with the punch retainer and recompaction die, between the two columns and over the edges of the support blocks.
10. Depress both of the activator buttons to raise the assembly until the can freely slides away from the core pin assembly.
11. Keep the recompaction die in place to facilitate the insertion of the separator.

The separator (P.G.I. Nonwoven 7638) is placed within the four lobe cavity. An anode mixture was prepared by combining (in weight percentages) 70% zinc powder (Zinc Corp. of America 1216), a gelling agent (Carbopol 940 from BF Goodrich), and 30% electrolyte (composed of 98.6% liquid electrolyte and 1.4% of the dissolved gelling agent). The anode mixture then was dispersed into the cavities. The top assembly including top cap 32, current collector 28, and seal 30, was placed over the housing and mechanically crimped over to seal the battery. A sealant (Spec Seal) was applied to the side of the housing prior to the assembly.

Figure 3:
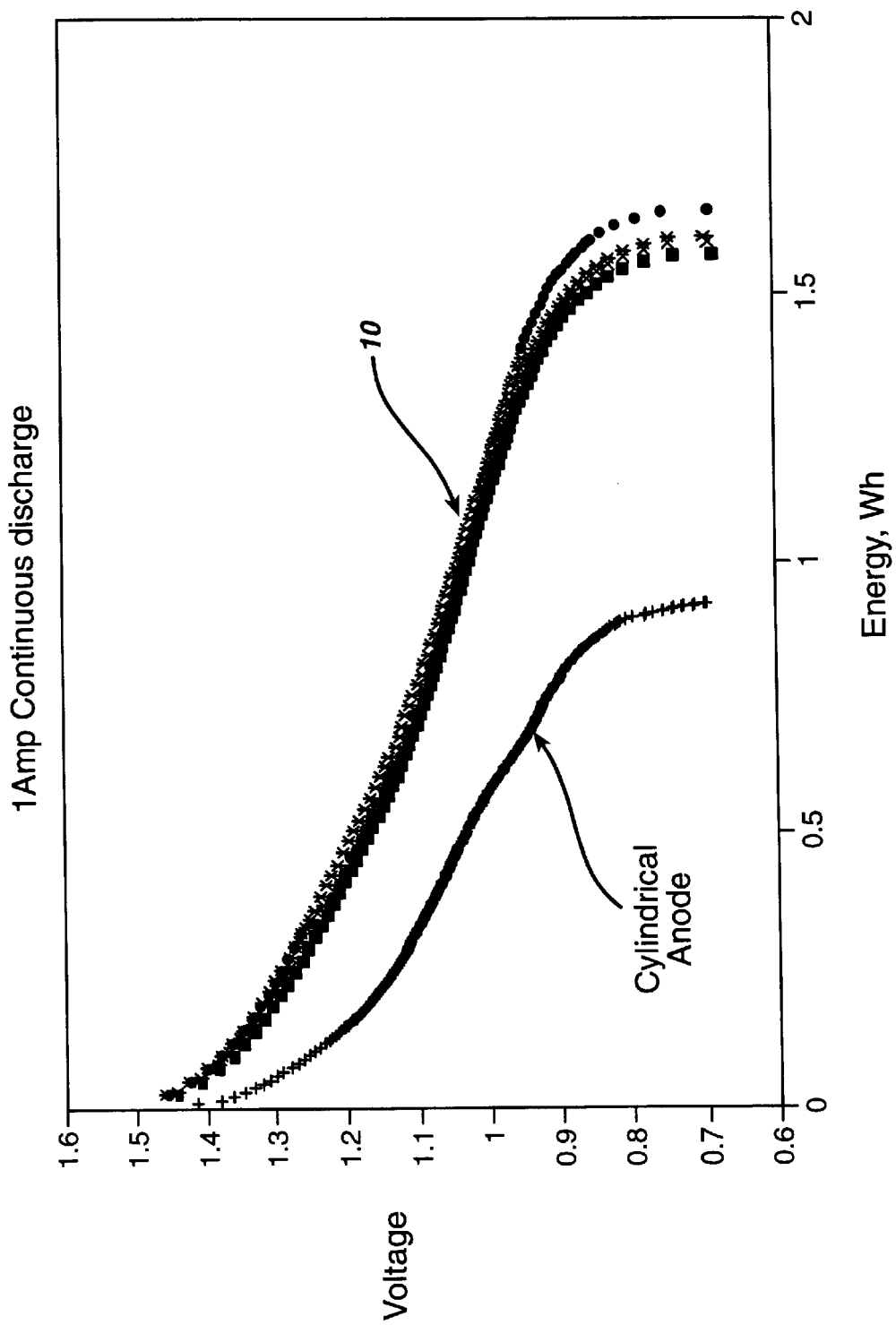
FIG. 3 is a plot of Voltage v. Energy for two AA batteries discharged continuously at 1 amp.

In battery 10, cathode 12 and anode 14 have an enhanced interface area because of the four lobes. As a result referring to FIG. 3, battery 10 has an increased service life when discharged continuously, for example, at 1 amp, in comparison with an AA battery having the same components and composition, except that a cylindrical anode is used.

Moreover, during use of battery 10, the cathode material closest to the outer surface of the anode generally will be consumed first, and over time areas of consumed cathode material extend generally outwardly from the surface of the anode. Because $d_1$ is twice $d_2$, as the area of consumed cathode material expands it will tend to reach housing 20 and the area of consumed cathode material expanding from an adjacent lobe at approximately the same time. As a result, the efficiency of consumption of the cathode material is maximized, thus increasing the life of the battery.

Figure 4:
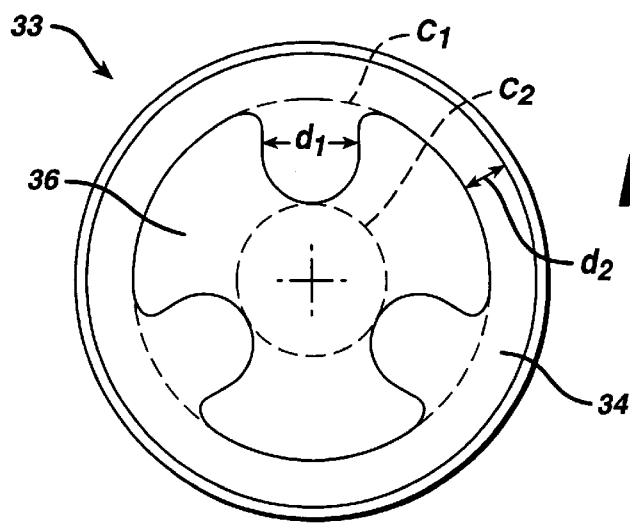
FIG. 4 is a cross-sectional view of a battery including a central anode having three lobes.

Other embodiments are within the claims. For example, referring to FIG. 4, battery 33 includes cathode 34 and anode 36 including three lobes. The anode has an external surface bounded by a first circle ($C_1$) and a second surface ($C_2$). Each lobe includes two linear side portions. The adjacent side portions on adjacent lobes are parallel and separated by a distance $d_1$ and each lobe is a distance $d_2$ from the housing. As in battery 10, in battery 33 $d_1$ is approximately twice $d_2$.

Figure 5:
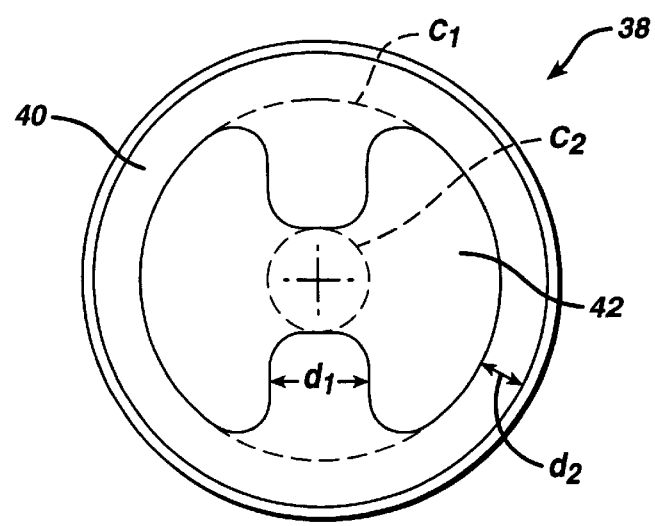
FIG. 5 is a cross-sectional view of a battery including a central anode having two lobes.

Similarly, referring to FIG. 5, battery 38 includes cathode 40 and anode 42 including two lobes. The anode has an external surface bounded by a first circle ($C_1$) and a second surface ($C_2$). Each lobe includes two linear side portions. The adjacent side portions on the two lobes are separated by a distance $d_1$ and each lobe is a distance $d_2$ from the housing. Like in battery 10 and battery 33, in battery 38 $d_1$ is approximately twice $d_2$.

Figure 6:
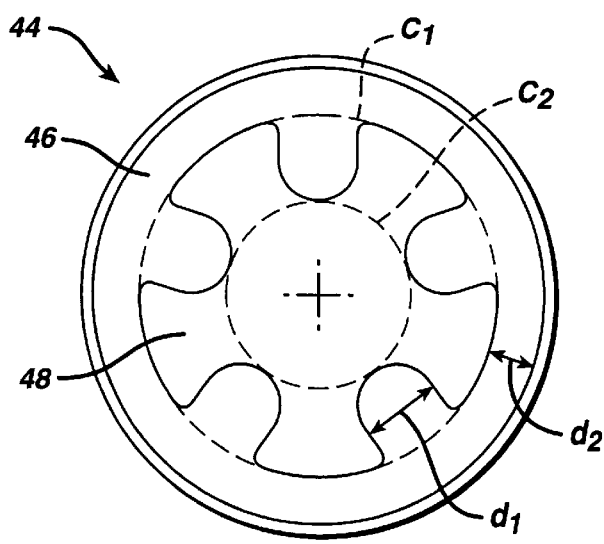
FIGS. 6–8 are cross-sectional views of a batteries including a central anode having five lobes.

Analogously, referring to FIG. 6, battery 44 includes cathode 46 and anode 48 including five lobes. The anode has an external surface bounded by a first circle ($C_1$) and a second surface ($C_2$). Each lobe includes five generally linear side portions. The side portions on adjacent lobes are separated by a distance $d_1$ and each lobe is a distance $d_2$ from the housing. As in battery 10, battery 33, and battery 38, $d_1$ is approximately twice $d_2$.

Figure 7:
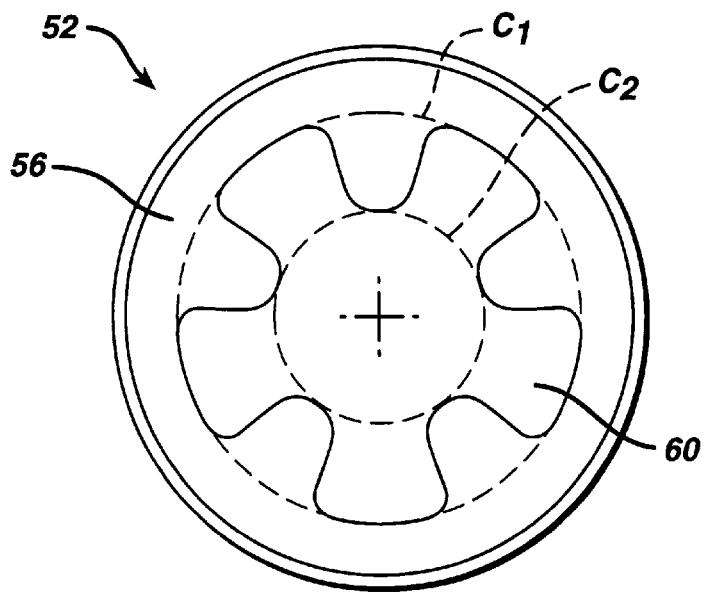
Figure 8:
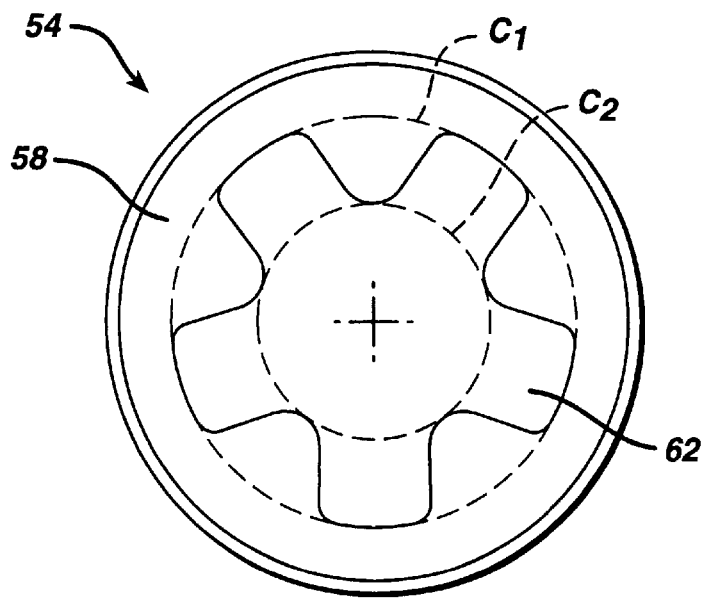

Referring to FIG. 7 and FIG. 8, batteries 52 and 54 include cathodes 56 and 58, respectively, and anodes 60 and 62, respectively. Anodes 60 and 62 have five lobes, but are shaped differently from anode 48 in battery 44. Each anode has an external surface bounded by a first circle ($C_1$) and a second surface ($C_2$).

In any of the embodiments, the positions of the cathode and the anode may be reversed. In addition, the current collector may include multiple prongs, for example, a separate prong for each lobe in the central electrode.

In addition, the cathode can be prepared by an extrusion process using an extrusion rod. Such a process is described, for example, in U.S. Ser. No. 09/054,939, which is assigned to the same assignee as the present application and is hereby incorporated by reference.

What is claimed is:
1. A battery comprising:
   a housing;
   a first electrode within the housing;
   a second electrode within the first electrode, the second electrode having an external surface bounded by a first circle of radius $r_1$ and a second circle of radius $r_2$; and
   a separator between the first electrode and the second electrode;

wherein either the first electrode or the second electrode is an anode comprising zinc in particle form.

2. A battery comprising:
a housing;
a first electrode within the housing;
a second electrode within the first electrode and including an electrode-active component in particle form, the second electrode having an external surface bounded by a first circle of radius $r_1$ and a second circle of radius $r_2$; and
a separator between the first electrode and the second electrode;
wherein either the first electrode is a cathode comprising manganese dioxide.

3. A battery comprising:
a housing;
a first electrode within the housing;
a second electrode within the first electrode, the second electrode having a convex curvalinear external surface bounded by a first circle of radius $r_1$ and a second circle of radius $r_2$; and
a separator between the first electrode and the second electrode.

4. The battery of claims 1, 2, or 3, wherein $r_2$ is less than 90% of $r_1$.

5. The battery of claims 1, 2, or 3, wherein $r_2$ is less than 80% of $r_1$.

6. The battery of claims 1, 2, or 3, wherein $r_2$ is less than 60% of $r_1$.

7. The battery of claims 1, 2, or 3, wherein the second electrode comprises a plurality of lobes.

8. The battery of claims 1, 2, or 3, wherein the second electrode comprises three lobes.

9. The battery of claims 1, 2, or 3, wherein the second electrode comprises four lobes.

10. The battery of claims 1, 2, or 3, wherein the second electrode comprises five lobes.

11. The battery of claims 1, 2, or 3, wherein the second electrode includes no more than two lobes.

12. The battery of claims 1, 2, or 3, wherein the battery is a AA battery.

13. The battery of claims 1, 2, or 3, wherein the battery is a AAA battery.

14. The battery of claims 1, 2, or 3, wherein the battery is a AAAA battery.

15. The battery of claims 1, 2, or 3, wherein the battery is a C battery.

16. The battery of claims 1, 2, or 3, wherein the battery is a D battery.

17. The battery of claims 1, or 3, wherein the second electrode is an anode comprising zinc.

18. The battery of claim 17, wherein the first electrode is a cathode comprising manganese dioxide.

19. The battery of claims 1, or 3, wherein the first electrode is a cathode comprising manganese dioxide.

20. The battery of claims 1, 2, or 3, wherein the second electrode is an anode.

21. The battery of claims 1, 2, or 3, wherein the second electrode is a cathode.

22. The battery of claims 1, 2, or 3, wherein the housing is cylindrical.

23. The battery of claim 2, wherein the electrode-active component comprises zinc.

24. A battery comprising:
a housing;
a first electrode within the housing;
a second electrode within the first electrode, the second electrode comprising a plurality of lobes, each of the lobes having
a first linear side portion that is a distance $d_1$ from a linear side portion of an adjacent lobe, and
a second linear side portion that also is a distance $d_1$ from a linear side portion of an adjacent lobe; and
a separator between the first electrode and the second electrode;
wherein each of the lobes is a minimum distance $d_2$ from the housing and wherein each ratio $d_1:d_2$ for each of the lobes is between 1.5:1 and 2.5:1.

25. The battery of claim 24, wherein each ratio $d_1:d_2$ for each of the lobes is between 1.7:1 and 2.3:1.

26. The battery of claim 24, wherein each ratio $d_1:d_2$ for each of the lobes is between 1.8:1 and 2.2:1.

27. The battery of claim 24, wherein each ratio $d_1:d_2$ for each of the lobes is between 1.9:1 and 2.1:1.

28. The battery of claim 24, wherein the second electrode comprises three of the lobes.

29. The battery of claim 24, wherein the second electrode comprises four of the lobes.

30. The battery of claim 24, wherein the second electrode comprises five of the lobes.

31. The battery of claim 24, wherein the second electrode includes no more than two lobes.

32. The battery of claim 24, wherein the first electrode is a cathode comprising manganese dioxide.

33. The battery of claims 24 or 32, wherein the second electrode is an anode comprising zinc.

34. The battery of claim 24, wherein the housing is cylindrical.

35. The battery of claim 24, wherein the battery is an AA.

36. The battery of claim 24, wherein the battery is an AAA.

37. The battery of claim 24, wherein the battery is an AAAA battery.

38. The battery of claim 24, wherein the battery is an C battery.

39. The battery of claim 24, wherein the battery is an D battery.

40. A battery comprising:
a housing;
a first electrode within the housing;
a second electrode within the first electrode, the second electrode comprising a first lobe and a second lobe, the first lobe having a first linear side portion that is a distance $d_1$ from a side portion on the second lobe, the first lobe being a minimum distance $d_2$ from the housing, the ratio $d_1:d_2$ being between 1.5:1 and 2.5:1; and
a separator between the first electrode and the second electrode.

41. The battery of claim 40, wherein the ratio $d_1:d_2$ is between 1.7:1 and 2.3:1.

42. The battery of claim 40, wherein the ratio $d_1:d_2$ is between 1.8:1 and 2.2:1.

43. The battery of claim 40, wherein the ratio $d_1:d_2$ is between 1.9:1 and 2.1:1.

44. The battery of claim 40, wherein the first electrode is a cathode comprising manganese dioxide.

45. The battery of claim 40, wherein the housing is cylindrical.

46. The battery of claim 40, wherein the side portion on the second lobe is linear.

47. The battery of claim 46, wherein the second electrode includes only from two to five lobes.

48. A battery comprising:
   a housing;
   a first electrode within the housing;
   a second electrode within the first electrode, the second electrode having a plurality of lobes having a convexly curved outer portion; and
   a separator between the first electrode and the second electrode.

49. The battery of claim 48, wherein the second electrode includes three lobes.

50. The battery of claim 48, wherein the second electrode includes four lobes.

51. The battery of claim 48, wherein the second electrode includes five lobes.

52. The battery of claim 48, wherein the housing is cylindrical.

53. The battery of claim 48, wherein the second electrode includes no more than two lobes.

54. The battery of claim 48, wherein the second electrode include a plurality of zinc particles.

* * * * *